(12) United States Patent
Nakamura et al.

(10) Patent No.: US 12,036,808 B2
(45) Date of Patent: Jul. 16, 2024

(54) INK JET RECORDING METHOD USING TEMPORARY CURING RADIATION

(71) Applicant: Seiko Epson Corporation, Tokyo (JP)

(72) Inventors: Kiyoshi Nakamura, Matsumoto (JP); Yoshinobu Yoshida, Shiojiri (JP); Chigusa Sato, Matsumoto (JP); Asako Kubota, Suwa (JP); Shohei Namikoshi, Shiojiri (JP); Tsuyoshi Sano, Shiojiri (JP)

(73) Assignee: SEIKO EPSON CORPORATION (JP)

( * ) Notice: Subject to any disclaimer, the term of this patent is extended or adjusted under 35 U.S.C. 154(b) by 168 days.

(21) Appl. No.: 17/702,029

(22) Filed: Mar. 23, 2022

(65) Prior Publication Data
US 2022/0305834 A1 Sep. 29, 2022

(30) Foreign Application Priority Data

Mar. 24, 2021 (JP) ................................. 2021-049612

(51) Int. Cl.
B41M 7/00 (2006.01)
C09D 11/322 (2014.01)
C09D 11/40 (2014.01)
(52) U.S. Cl.
CPC ......... B41M 7/0081 (2013.01); C09D 11/322 (2013.01); C09D 11/40 (2013.01)

(58) Field of Classification Search
CPC . B41M 7/0081; B41M 5/0023; C09D 11/322; C09D 11/40; C09D 11/101; B41J 2/01; B41J 11/0021
See application file for complete search history.

(56) References Cited

U.S. PATENT DOCUMENTS

2013/0286085 A1* 10/2013 Kondo .................. B41J 2/2114
347/20
2013/0286095 A1* 10/2013 Wada ................. B41J 11/00214
347/43

FOREIGN PATENT DOCUMENTS

JP 2008-006695 A 1/2008
JP 2016-147500 A 8/2016

* cited by examiner

Primary Examiner — Bradley W Thies
(74) Attorney, Agent, or Firm — Harness, Dickey & Pierce, P.L.C.

(57) ABSTRACT

An ink jet recording method is a method in which a cyan ink, a magenta ink, a black ink, and a yellow ink radiation that are curable inks are ejected from ink jet heads to attach the radiation curable inks to a recording medium. The method includes, in this order, a first step of attaching the cyan ink, the magenta ink, and the black ink onto the recording medium and applying temporary curing radiation to the recording medium and a second step of attaching the yellow ink onto the recording medium and applying full curing radiation to the recording medium without applying the temporary curing radiation.

9 Claims, 3 Drawing Sheets

INK JET RECORDING METHOD USING TEMPORARY CURING RADIATION

The present application is based on, and claims priority from JP Application Serial Number 2021-049612, filed Mar. 24, 2021, the disclosure of which is hereby incorporated by reference herein in its entirety.

BACKGROUND

1. Technical Field

The present disclosure relates to an ink jet recording method.

2. Related Art

JP-A-2008-6695 discloses an ink jet apparatus including a recording medium transportation unit that transports a recording medium, an ink jet head unit that ejects ink toward the recoding medium, and an active energy irradiator that applies active energy to cure the ink. The ink is cured when irradiated with ultraviolet radiation, for example, and thus is fixed quickly.

The ink jet apparatus disclosed in JP-A-2008-6695 ejects ink onto a recording medium, and shortly after the ejection, applies active energy to the ink to fix the ink. Specifically described, the ink jet apparatus ejects a yellow ink and fixes the yellow ink, ejects a cyan ink and fixes the cyan ink, ejects a magenta ink and fixes the magenta ink, and ejects a black ink and fixes the black ink, in this order. In this way, recording using four colors of ink is performed.

The yellow ink absorbs more active energy with the pigment than the inks of the other colors. Thus, the yellow ink absorbs less active energy with the polymerizable compound, resulting in lower reaction efficiency of the polymerizable compound. This makes it difficult for the inner portions of the liquid droplets of yellow ink to be cured. The delayed curing of the inner portion of the liquid droplet causes curing wrinkles on the surface of the coating film, reducing the gloss of the coating film.

SUMMARY

According to an aspect of the present disclosure, an ink jet recording method is a method in which a cyan ink, a magenta ink, a black ink, and a yellow ink that are radiation curable inks are ejected from ink jet heads to a recording medium. The method includes, in this order, a first step of attaching the cyan ink, the magenta ink, and the black ink onto the recording medium and applying temporary curing radiation to the recording medium and a second step of attaching the yellow ink onto the recording medium and applying full curing radiation to the recording medium without applying the temporary curing radiation.

DESCRIPTION OF EXEMPLARY EMBODIMENTS

Hereinafter, an ink jet recording method according to the present disclosure will be described by using embodiments illustrated in the attached drawings.

1. Printer

First, an example of a printer used in an ink jet recording method according to the present disclosure is described.

Figure 1:
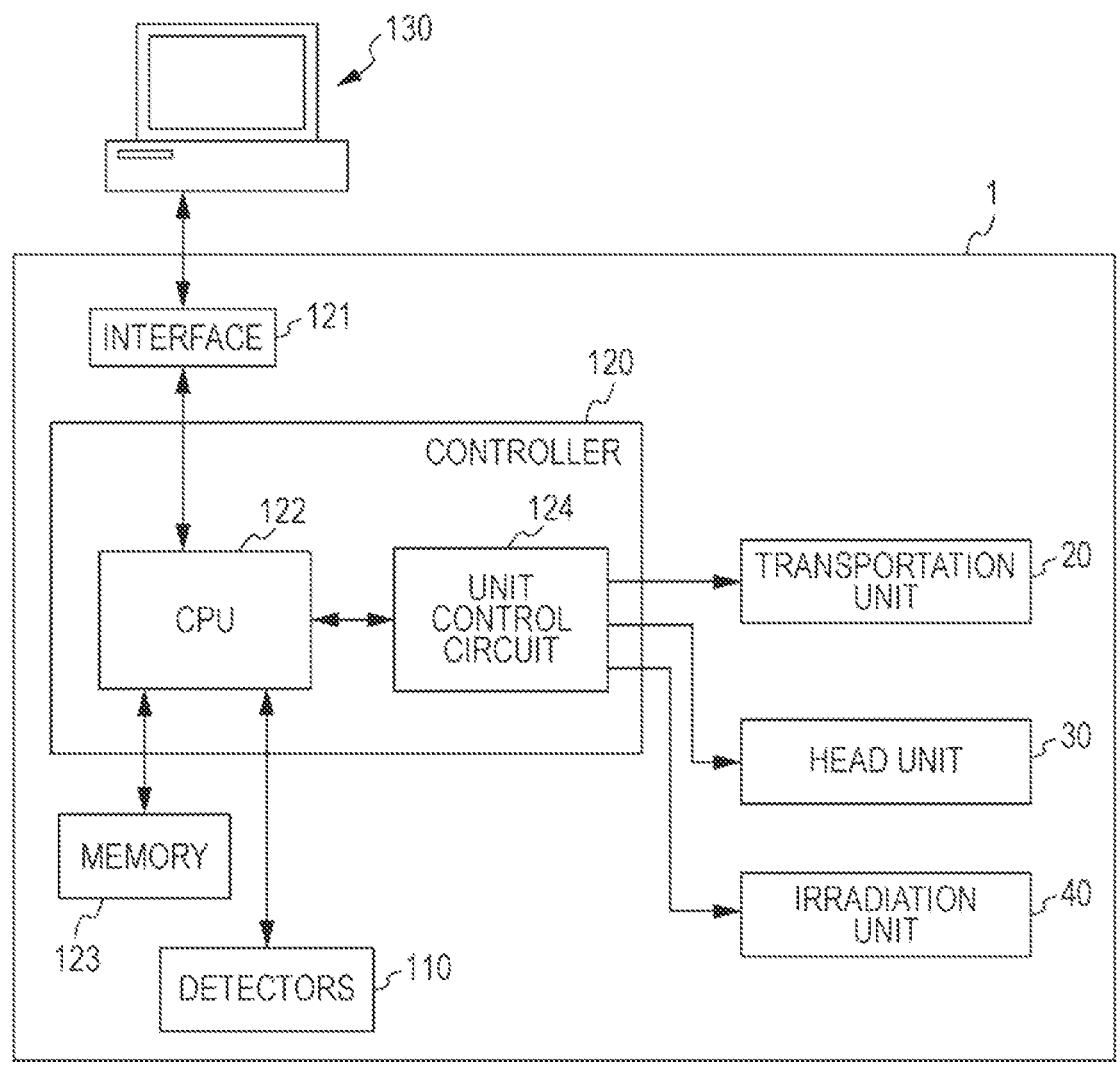
FIG. 1 is a block diagram illustrating an example of a printer used in an ink jet recording method according to an embodiment.

FIG. 1 is a block diagram illustrating an example of a printer used in the ink jet recording method according to this embodiment.

FIG. 1 illustrates a printer 1 and a computer 130 coupled to the printer 1. The computer 130 is pre-installed with a printer driver and outputs print data for an image to be formed on a recording medium to the printer 1.

The printer 1 in FIG. 1 includes a transportation unit 20, a head unit 30, an irradiation unit 40, an ink supply unit (not illustrated), detectors 110, memory 123, an interface 121, and a controller 120.

In the printer 1, upon reception of print data from the computer 130, the controller 120 controls the units to record an image of the print data onto a recording medium. The status of the printer 1 is monitored by the detectors 110. The detectors 110 output detection results to the controller 120. The controller 120 controls the units based on the detection results from the detectors 110.

The controller 120 includes a CPU 122 and a unit control circuit 124. The CPU is a central processing unit. The controller 120 causes the memory 123 to store the print data inputted through the interface 121. The memory 123 also stores control information used in the control of the units.

The printer 1 forms images using radiation curable inks of five colors including cyan, magenta, orange, black, and yellow. The radiation curable ink is curable when irradiated with radiation and, as described later, contains a polymerizable compound that is polymerized when irradiated with radiation and coloring agents having various colors. Colors and the number of colors of the radiation curable inks used in the printer 1 are not limited to the above colors and number.

The printer 1 may be a line printer or a serial printer, for example. In the following description, the printer 1 is a line printer.

Figure 2:
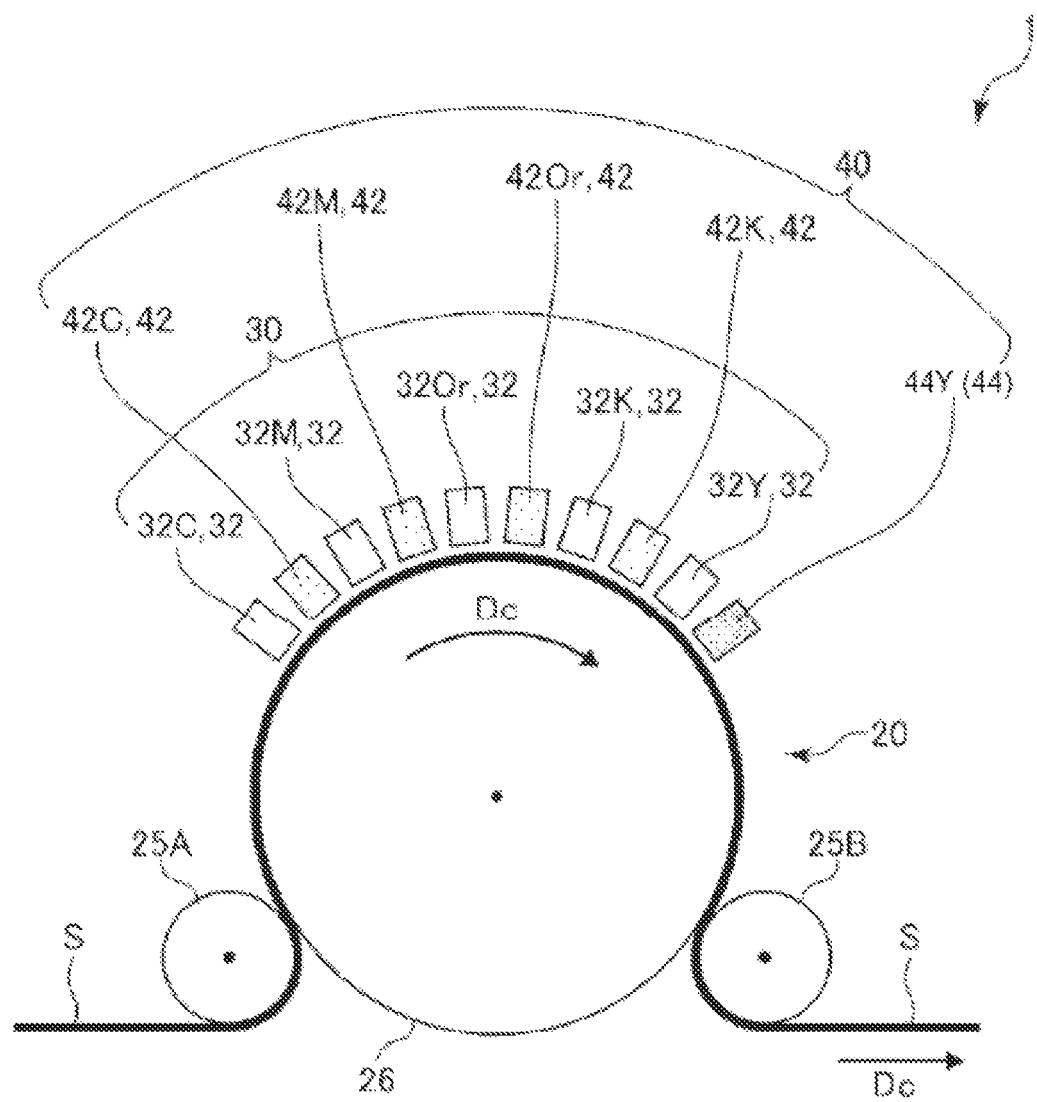
FIG. 2 is a vertical cross-sectional view schematically illustrating a transportation unit, a head unit, and an irradiation unit in FIG. 1.

FIG. 2 is a vertical cross-sectional view schematically illustrating the transportation unit 20, the head unit 30, and the irradiation unit 40 in FIG. 1.

The transportation unit 20 in FIG. 2 includes a transportation motor (not illustrated), an upstream roller 25A, a downstream roller 25B, and a transportation drum 26. The upstream and downstream rollers 25A and 25B are rotated by the power from the transportation motor, and the transportation drum 26 is driven by the rotation.

The recording medium S is transported on surfaces of the upstream roller 25A, the downstream roller 25B, and the transportation drum 26 in a transportation direction Dc.

The head unit 30 in FIG. 2 includes multiple line heads 32. The line heads 32 are each an ink jet head that ejects a radiation curable ink to the recording medium S for recording. The line head 32 includes cavities (not illustrated) that store the radiation curable ink to be ejected through nozzles, ejection drivers (not illustrated) provided for the respective cavities to apply ejection force to the radiation curable ink, and nozzles (not illustrated) provided for the respective cavities and through which the radiation curable ink is ejected from the line head 32. The line heads 32 each include independent multiple cavities, independent multiple ejection drivers provided for the respective cavities, and independent multiple nozzles provided for the respective cavities. Examples of the ejection driver include an electromechanical conversion element such as a piezoelectric element, which changes the volume of the cavity by mechanical deformation, and an electrothermal conversion element, which generates heat to form bubbles in the ink to eject the ink.

In an example of this embodiment, the head unit 30 ejects ink of five colors including cyan, magenta, orange, black, and yellow. The head unit 30 includes five line heads 32 including a cyan head 32C that ejects a cyan ink, a magenta head 32M that ejects a magenta ink, an orange head 32Or that ejects an orange ink, a black head 32K that ejects a black ink, and a yellow head 32Y that ejects a yellow ink. These line heads 32 are disposed around the transportation drum 26 in this order from upstream to downstream in the transportation direction Dc.

The cyan head 32C, the magenta head 32M, the orange head 32Or, the black head 32K, and the yellow head 32Y each have a length larger than the width of the recording medium S. In other words, the line head 32 in FIG. 2 has a length in a direction perpendicular to the plane of FIG. 2 larger than the width of the recording medium S. Ink is ejected from the fixed line heads 32 while the recording medium S is transported in the transportation direction Dc. The ink is attached to a target area of the recording medium S to make a printed record of a desired image.

The irradiation unit 40 illustrated in FIG. 2 applies radiation such as ultraviolet rays to the ink ejected from the head unit 30 to cure the ink. This fixes the ink of five colors on the recording medium S, and thus a printed record of an image is formed.

The irradiation unit 40 in FIG. 2 includes temporary curing irradiators 42 that apply temporary curing radiation and a full curing irradiator 44 that applies full curing radiation. In an example of this embodiment, the irradiation unit 40 includes four temporary curing irradiators 42 including a cyan irradiator 42C that cures the cyan ink, a magenta irradiator 42M that cures the magenta ink, an orange irradiator 42Or that cures the orange ink, and a black irradiator 42K that cures the black ink. Furthermore, the irradiation unit 40 includes a yellow irradiator 44Y that cures the yellow ink as the full curing irradiator 44. The temporary and full curing irradiators 42 and 44 are disposed around the transportation drum 26 in the above order from upstream to downstream in the transportation direction Dc.

The temporary curing irradiators 42 that cure inks of different colors are adjacent to the corresponding line heads 32 that eject the inks of different colors. As illustrated in FIG. 2, the cyan head 32C, the cyan irradiator 42C, the magenta head 32M, the magenta irradiator 42M, the orange head 32Or, the orange irradiator 42Or, the black head 32K, and the black irradiator 42K are arranged in this order around the transportation drum 26.

Furthermore, the full curing irradiator 44 that cures the yellow ink is adjacent to the yellow head 32Y that ejects the yellow ink. Thus, the yellow head 32Y and the yellow irradiator 44Y are arranged in this order downstream of the black irradiator 42K.

Herein, the term "temporary curing" means pinning of a radiation curable ink, or more specifically curing of a radiation curable ink before full curing in order to prevent bleeding between dots and in order to control the diameter of dots. The polymerization degree of a polymerizable compound achieved by the temporary curing is lower than that achieved by the full curing after the temporary curing.

Herein, the term "full curing" means curing of dots on the recording medium S to the extent that the recorded object is in a usable cured level.

Unless otherwise specified, "curing" mentioned herein means, without distinction between the temporary curing and the full curing, curing of at least a portion of the radiation curable ink, or polymerization of at least a portion of the polymerizable compound in the radiation curable ink that results in fixation of the radiation curable ink.

In the irradiation unit 40 in FIG. 2, the temporary curing irradiators 42 are adjacent to the corresponding line heads 32. However, the black irradiator 42K may be used to cure not only a black ink but also a cyan ink, a magenta ink, and an orange ink. In such a case, the cyan irradiator 42C, the magenta irradiator 42M, and the orange irradiator 42Or may be eliminated.

The temporary curing irradiators 42 and the full curing irradiator 44 are radiation sources that emit temporary curing radiation and full curing radiation. Examples of the radiation source include various lamps, such as a mercury lamp and a metal halide lamp, various light-emitting diodes, such an ultraviolet-light-emitting diode (UV-LED), and laser light sources, such as a gas laser, a solid-state laser, and an ultraviolet laser diode (UV-LD).

The peak wavelengths of the temporary curing radiation and the full curing radiation are preferably not less than 350 nm and not more than 410 nm. The radiation having the peak wavelength in the above range can achieve the intended degree of temporary curing and the intended degree of full curing. When the peak wavelength is in the above range, ejection order of the radiation curable inks is determined by colors in accordance with active energy absorptions of the pigments of the radiation curable inks. This enables the coating films of inks to optimally wet spread and optimally accelerate the curing of the inner portions, making it easier for the coating films of inks to have the uniform final gloss, and thus a recorded object having a high-quality image is produced. Furthermore, the above peak wavelengths are within a range of the reaction wavelengths of easily available photopolymerization initiators, making it possible to reduce the cost of the radiation curable ink. Furthermore, radiation sources that emit radiation having peak wavelengths in the above range are less costly and smaller in size and are easily available.

The recording medium S may be an absorbent recording medium or a non-absorbent recording medium. Examples of the absorbent recording medium include plain paper, ink jet paper, art paper, coated paper, and cast paper. An example of the plain paper is electrophotographic paper with high permeability to water-based ink. Examples of the ink jet paper include a paper medium having ink-absorbing layers composed of silica particles or alumina particles or having ink-absorbing layers composed of hydrophilic polymers such as polyvinyl alcohol (PVA) and polyvinylpyrrolidone (PVP). Art paper is a paper medium having relatively low permeability to water-based ink and used in ordinary offset printing.

Examples of the non-absorbent medium include plastic films and plastic plates made of polyvinyl chloride, polyethylene, polypropylene, and polyethylene terephthalate (PET), metal plates made of iron, silver, copper, and aluminum, metal plates and plastic films having deposition of the metals, and plates made of alloys such as stainless steel and brass.

2. Ink Jet Recording Method

Next, an ink jet recording method according to the present embodiment will be described.

Figure 3:
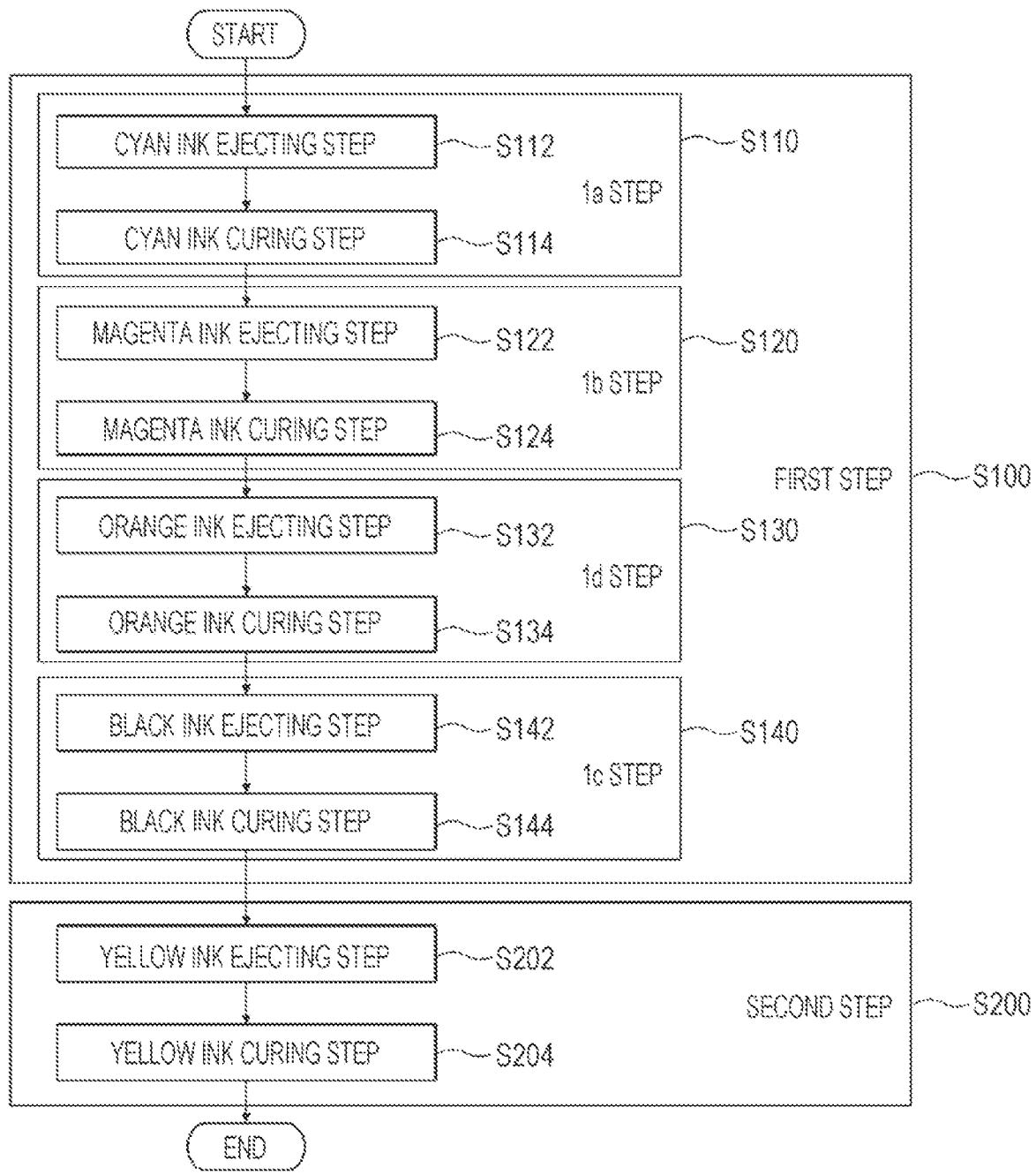
FIG. 3 is a flow chart representing the ink jet recording method according to an embodiment.

FIG. 3 is a flow chart representing an ink jet recording method according to the present embodiment. The ink jet recording method in FIG. 3 includes, in this order, a first step S100 and a second step S200.

The first step S100 includes a 1a step S110, a 1b step S120, a 1d S130, and a 1c step S140. The 1a step S110 includes a cyan ink ejecting step S112 and a cyan ink curing step S114. The 1b step S120 includes a magenta ink ejecting step S122 and a magenta ink curing step S124. The 1d step S130 includes an orange ink ejecting step S132 and an orange ink curing step S134. The 1c step S140 includes a black ink ejecting step S142 and a black ink curing step S144.

Furthermore, the second step S200 includes a yellow ink ejecting step S202 and a yellow ink curing step S204.

2.1. Cyan Ink Ejecting Step

The cyan ink ejecting step S112 includes ejecting a cyan ink from the cyan head 32C. The ejected liquid droplets of the cyan ink are attached to the recording medium S. The cyan ink on the recording medium S is transported in the transportation direction Dc indicated in FIG. 2 to an irradiation area where the ink is irradiated with temporary curing radiation emitted by the cyan irradiator 42C.

2.2. Cyan Ink Curing Step

The cyan ink curing step S114 includes emitting temporary curing radiation from the cyan irradiator 42C. The cyan ink on the recording medium S is temporary cured by the temporary curing radiation.

The irradiation energy per unit time of the temporary curing radiation applied to the recording medium S at the cyan ink curing step S114 may have any intensity smaller than the irradiation energy of the full curing radiation but is preferably not more than 20 mJ/cm$^2$, more preferably not less than 0.1 mJ/cm$^2$ and not more than 10 mJ/cm$^2$, and more preferably not less than 0.5 mJ/cm$^2$ and not more than 3 mJ/cm$^2$. The curing rate of the cyan ink is optimized when the intensity is in this range, and thus the cyan ink on the recording medium S is cured while properly wet spreading. Furthermore, the difference in the curing rate between the surface and the inner portion of the coating film is reduced. This reduces the occurrence of curing wrinkles on the surface of the coating film that has been subjected to temporary curing and makes the surface smooth, resulting in an improvement in the gloss of the recorded object subjected to the full curing. The irradiation energy of the temporary curing radiation is calculated by multiplying the irradiation intensity by the irradiation duration.

Herein, the term "curing wrinkles" means wrinkles caused, after the curing, on the surface of the coating film by an increase in polymerization volume shrinkage rate, which may be caused, in the process of curing, by irregular flow of an uncured radiation curable ink in the coating film before being cured.

The maximum of the irradiation intensity (irradiation peak intensity) of the temporary curing radiation is preferably not less than 100 mW/cm$^2$, more preferably not less than 200 mW/cm$^2$ and not more than 2000 mW/cm$^2$. The curing rate is optimized when the irradiation peak intensity is in the above range, allowing the coating film to be cured to the inner portion in a short time. This effectively reduces the occurrence of curing wrinkles on the surface of the coating film that has been subjected to the temporary curing.

Furthermore, the above-described irradiation energy of the temporary curing radiation is the irradiation energy of the first applied radiation after the attachment of the cyan ink to the recording medium S. The time between the end of ejection of the cyan ink and the application of the temporary curing radiation from the cyan irradiator 42C is not limited but is preferably not less than 0.001 second and not more than 1.00 second, more preferably not less than 0.005 second and not more than 0.50 second, and more preferably not less than 0.010 and not more than 0.15 second. This reduces bleeding of the cyan ink on the recording medium S.

2.3 Magenta Ink Ejecting Step

The magenta ink ejecting step S122 includes ejecting a magenta ink from the magenta head 32M. The ejected liquid droplets of the magenta ink are attached to the recording medium S. The magenta ink on the recording medium S is transported in the transportation direction Dc to an irradiation area where the ink is irradiated with temporary curing radiation emitted by the magenta irradiator 42M.

2.4. Magenta Ink Curing Step

The magenta ink curing step S124 includes emitting temporary curing radiation from the magenta irradiator 42M. The magenta ink on the recording medium S is temporary cured by the temporary curing radiation.

At the magenta ink curing step S124, the irradiation energy of the temporary curing radiation applied to the recording medium S, the irradiation peak intensity, and the time between the end of ejection of the magenta ink and the application of the temporary curing radiation are the same as those at the cyan ink curing step S114.

2.5. Orange Ink Ejecting Step

The orange ink ejecting step S132 includes ejecting an orange ink from the orange head 32Or. The ejected liquid droplets of the orange ink are attached to the recording medium S. The orange ink on the recording medium S is transported in the transportation direction Dc to an irradiation area where the ink is irradiated with temporary curing radiation emitted by the orange irradiator 42Or.

2.6. Orange Ink Curing Step

The orange ink curing step S134 includes emitting temporary curing radiation from the orange irradiator 42Or. The orange ink on the recording medium S is temporary cured by the temporary curing radiation.

At the orange ink curing step S134, the irradiation energy of the temporary curing radiation applied to the recording medium S, the irradiation peak intensity, and the time between the end of ejection of the orange ink and the application of the temporary curing radiation are the same as those at the cyan ink curing step S114.

2.7. Black Ink Ejecting Step

The black ink ejecting step S142 includes ejecting a black ink from the black head 32K. The ejected liquid droplets of the black ink are attached to the recording medium S. The black ink on the recording medium S is transported in the transportation direction Dc to an irradiation area where the ink is irradiated with temporary curing radiation emitted by the black irradiator 42K.

2.8. Black Ink Curing Step

The black ink curing step S144 includes emitting temporary curing radiation from the black irradiator 42K. The black ink on the recording medium S is temporary cured by the temporary curing radiation.

At the black ink curing step S144, the irradiation energy of the temporary curing radiation applied to the recording medium S, the irradiation peak intensity, and the time between the end of ejection of the black ink and the application of the temporary curing radiation are the same as those at the cyan ink curing step S114.

The black ink absorbs more active energy with the pigment than the cyan ink, the magenta ink, and the orange ink. In view of this, the irradiation energy of the temporary curing radiation applied to the recording medium S may be larger at the black ink curing step S144 than at the cyan ink curing step S114, the magenta ink curing step S124, and the orange ink curing step S134. The curing rate of the black ink is optimized by this, and thus the black ink on the recording medium S is cured while suitably wet spreading. Furthermore, the difference in the curing rate between the surface and the inner portion of the coating film is reduced. This reduces the occurrence of curing wrinkles on the surface of the coating film that has been subjected to the temporary curing.

2.9. Yellow Ink Ejecting Step

The yellow ink ejecting step S202 includes ejecting a yellow ink from the yellow head 32Y. The ejected liquid droplets of the yellow ink are attached to the recording medium S. The yellow ink on the recording medium S is transported in the transportation direction Dc to an irradiation area where the ink is irradiated with full curing radiation emitted by the yellow irradiator 44Y.

2.10. Yellow Ink Curing Step

The yellow ink curing step S204 includes emitting full curing radiation, without emitting the temporary curing radiation, from the yellow irradiator 44Y. The yellow ink on the recording medium S is full cured by the full curing radiation. Furthermore, the cyan ink, the magenta ink, the orange ink, and the black ink, which have been temporary cured, are irradiated with full curing radiation to be full cured.

The irradiation energy per unit time of the full curing radiation applied to the recording medium S at the yellow ink curing step S204 may have any intensity larger than the irradiation energy of the temporary curing radiation. However, the irradiation energy is preferably not less than 50 $mJ/cm^2$, more preferably not less than 100 $mJ/cm^2$ and not more than 600 $mJ/cm^2$, and more preferably not less than 200 $mJ/cm^2$ and not more than 500 $mJ/cm^2$. When the irradiation energy is in this range, the curing rate of the yellow ink is optimized, and thus the yellow ink on the recording medium S is cured while sufficiently wet spreading. Furthermore, the difference in the curing rate between the surface and the inner portion of the coating film is reduced. This reduces the possibility that the coating film of the yellow ink will have curing wrinkles on the surface although the yellow ink absorbs more active energy with the pigment. Thus, the surface of the coating film is smooth, resulting in an improvement in the gloss of the recorded object that has been subjected to full curing. The irradiation energy of the full curing radiation is calculated by multiplying the irradiation intensity by the irradiation duration.

The maximum of the irradiation intensity (irradiation peak intensity) of the full curing radiation is preferably not less than 800 $mW/cm^2$, more preferably not less than 1000 $mW/cm^2$ and not more than 3000 $mW/cm^2$. The curing rate is optimized when the irradiation peak intensity is in the above range, allowing the coating film to be cured to the inner portion of the coating film in a short time. This effectively reduces the occurrence of curing wrinkles on the surface of the coating film that has been subjected to the full curing.

It is preferable that the irradiation peak intensity of the full curing radiation be larger than the irradiation peak intensity of the temporary curing radiation. This allows the irradiation energy of the full curing radiation to be larger than the irradiation energy of the temporary curing radiation when the irradiation durations are the same, for example. This simplifies the structure and the control of the printer 1, for example.

Furthermore, the above-described irradiation energy of the full curing radiation is the irradiation energy of the first applied radiation after the attachment of the yellow ink to the recording medium S. The time between the end of ejection of the yellow ink and the application of the full curing radiation from the yellow irradiator 44Y is not limited but is preferably not less than 0.01 second and not more than 1.00 second, more preferably not less than 0.02 second and not more than 0.50 second, and more preferably not less than 0.03 second and not more than 0.15 second. This reduces bleeding of the yellow ink on the recording medium S.

As described above, the ink jet recording method according to the present embodiment is a method in which a cyan ink, a magenta ink, a black ink, and a yellow ink that are radiation curable inks are ejected from ink jet heads to the recording medium S. The method includes, in this order, the first step S100 and the second step S200. The first step S100 includes attaching the cyan ink, the magenta ink, and the black ink onto the recording medium S and applying the temporary curing radiation to the recording medium S. The second step S200 includes attaching the yellow ink onto the recording medium S and applying the full curing radiation to the recording medium S, without applying the temporary curing radiation.

In this configuration, the full curing radiation, not the temporary curing radiation, is applied shortly after the ejection of the yellow ink. Thus, the coating film of the yellow ink, which absorbs more active energy with the pigment, is cured to the inner portion in short time. This reduces the occurrence of curing wrinkles on the surface of the coating film of the yellow ink.

Furthermore, the temporary curing radiation is applied to the cyan ink, the magenta ink, and the black ink shortly after the ejection of the inks, and thus the curing rate thereof is optimized and the inks properly wet spread. This reduces the occurrence of wrinkles on all the coating films.

Furthermore, in the ink jet recording method according to the present embodiment, the cyan ink, the magenta ink, and the black ink that are the radiation curable inks are attached to the recording medium S in this order. The ejection order of inks corresponds to the ascending order of active energy absorption of the inks with the pigments. The ejection of the radiation curable inks in this order readily makes the extent of the wet spread of the inks uniform in all the coating films.

Thus, a recorded object having a high-quality image with less gloss unevenness in the coating films is produced.

Furthermore, the first step S100 according to the present embodiment includes the 1a step S110, the 1b step S120, and the 1c step S140. The 1a step S110 includes attaching a cyan ink to the recording medium S and applying temporary curing radiation to the cyan ink on the recording medium S. The 1b step S120 includes attaching a magenta ink to the recording medium S after the 1a step S110 and applying temporary curing radiation to the magenta ink on the recording medium S. The 1c step S140 includes attaching a black ink to the recording medium S after the 1b step S120 and applying temporary curing radiation to the black ink on the recording medium S.

In this configuration, shortly after the ejection of the radiation curable inks including the cyan ink, the magenta ink, and the black ink, the inks are irradiated with the temporary curing radiation. This enables the proper control of the extent of the wet spread of the radiation curable inks, notably reducing the difference in gloss between the coating films. Thus, the recorded object having a high-quality image is produced.

Furthermore, in this embodiment, the first step S100 further includes the 1d step S130. The 1d step S130 is performed after the 1b step S120 and before the 1c step S140. The 1d step S130 includes attaching a radiation curable ink of an orange ink to the recording medium S and applying temporary curing radiation to the recording medium S. A red ink may be used instead of the orange ink.

In this configuration, shortly after the ejection of the radiation curable inks including the cyan ink, the magenta ink, one of the orange ink and the red ink, and the black ink, the inks are irradiated with the temporary curing radiation. The ejection order corresponds to the ascending order of active energy absorption of the inks with the pigments. This enables proper control of the extent of the wet spread of the radiation curable inks, notably reducing the difference in gloss between the coating films. Thus, a recorded object having a high-quality image is produced.

When the red ink is used, the irradiation energy of the temporary curing radiation applied to the recording medium S having the red ink, the irradiation peak intensity, and the time between the end of ejection of the red ink and the application of the temporary curing radiation are the same as those at the above-described orange ink curing step S134. The 1d step S130 is optional.

In the first step S100, it is preferable that the 1a step S110, the 1b step S120, the 1d step S130, and the 1c step S140 be performed in the above order. However, the order is not limited to the above and the four steps may be performed in a different order.

3. Radiation Curable Ink

Next, an example of the radiation curable ink will be described. In the following description, the radiation curable ink is simply referred to as "ink" in some cases.

3.1. Polymerizable Compound

The radiation curable ink contains a polymerizable compound and is cured when the polymerizable compound is polymerized alone or by the action of a photopolymerization initiator (described later) upon irradiation with radiation.

Examples of the polymerizable compound include known monomers and oligomers, such as monofunctional, bifunctional, and trifunctional or higher polyfunctional monomers and oligomers. Examples of the monomers include unsaturated carboxylic acids such as (meth)acrylic acid, itaconic acid, crotonic acid, isocrotonic acid, and maleic acid, salts or esters thereof, urethane, amides and anhydrides thereof, acrylonitrile, styrene, various unsaturated polyesters, unsaturated polyether, unsaturated polyamide, and unsaturated urethane. Examples of the oligomers include oligomers that consist of the monomers listed above, such as a linear acrylic oligomer, epoxy(meth)acrylate, oxetane(meth)acrylate, aliphatic urethane(meth)acrylate, aromatic urethane(meth)acrylate, and polyester(meth)acrylate.

Among these, (meth)acrylic acid esters, or (meth)acrylates are preferably employed. The (meth)acrylate is preferably at least one of a vinyl ether group-containing (meth)acrylic acid ester represented by the general formula (I) and other monofunctional (meth)acrylates, more preferably the vinyl ether group-containing (meth)acrylic acid ester, and still more preferably a combination of the vinyl ether group-containing (meth)acrylic acid ester and another monofunctional (meth)acrylate.

Hereinafter, the polymerizable compound will be described in detail focusing on (meth)acrylate. Herein, "(meth)acrylate" represents at least one of acrylate and corresponding methacrylate, and "(meth)acryl" represents at least one of acryl and corresponding methacryl.

3.1.1. Vinyl Ether Group-Containing (Meth)Acrylic Acid Esters

The radiation curable ink preferably includes a vinyl ether group-containing (meth)acrylic acid ester represented by the following general formula (I):

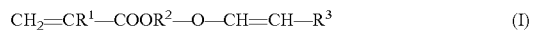
$$CH_2=CR^1-COOR^2-O-CH=CH-R^3 \quad (I)$$

in which $R^1$ represents a hydrogen atom or a methyl group, $R^2$ represents a C2 to C20 divalent organic residue, and $R^3$ represents a hydrogen atom or a C1 to C11 monovalent organic residue.

The presence of the vinyl ether group-containing (meth)acrylic acid ester in ink lowers the viscosity of the ink and improves the curability of the ink, and thus the occurrence of curing wrinkles is effectively reduced. Furthermore, to improve the curability, the presence of a compound having both a vinyl ether group and a (meth)acrylic group in one molecule is preferable to the presence of two separate compounds having a vinyl ether group and having a (meth)acrylic group.

Preferable examples of the C2 to C20 divalent organic residue represented by $R^2$ in the general formula (I) include optionally substituted linear, branched, or cyclic C2 to C20 alkylene groups, optionally substituted C2 to C20 alkylene groups having an oxygen atom of the ether bond or the ester bond in the structure, and optionally substituted C6 to C11 divalent aromatic groups. Among these, C2 to C6 alkylene groups, such as an ethylene group, an n-propylene group, an isopropylene group, and a butylene group, and C2 to C9 alkylene groups having an oxygen atom of the ether bond in the structure, such as an oxyethylene group, an oxy-n-propylene group, an oxyisopropylene group, and an oxybutylene group are preferable.

Preferable examples of the C1 to C11 monovalent organic residue represented by $R^3$ in the general formula (I) include optionally substituted linear, branched, or cyclic C1 to C10 alkyl groups and optionally substituted C6 to C11 aromatic groups. Among these, C1 to C2 alky groups, such as a methyl group and an ethyl group, and C6 to C8 aromatic groups, such as a phenyl group and a benzyl group are preferable.

When the above-described organic residues are optionally substituted groups, the substituents may be divided into a group having a carbon atom and a group having no carbon atom. When the substituent is a group having a carbon atom, the carbon atom is counted as the carbon atom of the organic residue. Examples of the group having a carbon atom include, but are not limited to, a carboxyl group and an alkoxy group, for example. Examples of the group not having a carbon atom include, but are not limited to, a hydroxyl group and a halo group, for example.

Examples of the vinyl ether group-containing (meth) acrylic acid ester include, but are not limited to, 2-vinyloxyethyl(meth)acrylate, 3-vinyloxypropyl(meth)acrylate, 1-methyl-2-vinyloxyethyl(meth)acrylate, 2-vinyloxypropyl (meth)acrylate, 4-vinyloxybutyl(meth)acrylate, 1-methyl-3-vinyloxypropyl(meth)acrylate, 1-vinyloxymethylpropyl (meth)acrylate, 2-methyl-3-vinyloxypropyl(meth)acrylate, 1,1-dimethyl-2-vinyloxyethyl(meth)acrylate, 3-vinyloxybutyl(meth)acrylate, 1-methyl-2-vinyloxypropyl(meth)acrylate, 2-vinyloxybutyl(meth)acrylate, 4-vinyloxycyclohexyl (meth)acrylate, 6-vinyloxyhexyl(meth)acrylate, 4-vinyloxymethylcyclohexylmethyl(meth)acrylate, 3-vinyloxymethylcyclohexylmethyl(meth)acrylate, 2-vinyloxymethylcyclohexylmethyl(meth)acrylate, p-vinyloxymethylphenylmethyl(meth)acrylate, m-vinyloxymethylphenylmethyl(meth)acrylate, o-vinyloxymethylphenylmethyl(meth)acrylate, 2-(vinyloxyethoxy)ethyl(meth)acrylate, 2-(vinyloxyisopropoxy)ethyl (meth)acrylate, 2-(vinyloxyethoxy)propyl(meth)acrylate, 2-(vinyloxyethoxy)isopropyl(meth)acrylate, 2-(vinyloxyisopropoxy)propyl(meth)acrylate, 2-(vinyloxyisopropoxy)isopropyl(meth)acrylate, 2-(vinyloxyethoxyethoxy)ethyl (meth)acrylate, 2-(vinyloxyethoxyisopropoxy)ethyl(meth) acrylate, 2-(vinyloxyisopropoxyethoxy)ethyl(meth)acrylate, 2-(vinyloxyisopropoxyisopropoxy)ethyl(meth)acrylate, 2-(vinyloxyethoxyethoxy)propyl(meth)acrylate, 2-(vinyloxyethoxyisopropoxy)propyl(meth)acrylate, 2-(vinyloxyisopropoxyethoxy)propyl(meth)acrylate, 2-(vinyloxyisopropoxyisopropoxy)propyl(meth)acrylate, 2-(vinyloxyethoxyethoxy)isopropyl(meth)acrylate, 2-(vinyloxyethoxyisopropoxy)isopropyl(meth)acrylate, 2-(vinyloxyisopropoxyethoxy)isopropyl(meth)acrylate, 2-(vinyloxyisopropoxyisopropoxy)isopropyl(meth)acrylate, 2-(vinyloxyethoxyethoxyethoxy)ethyl(meth)acrylate, 2-(vinyloxyethoxyethoxyethoxyethoxy)ethyl(meth)acrylate, 2-(isopropenoxyethoxy)ethyl(meth)acrylate, 2-(isopropenoxyethoxyethoxy)ethyl(meth)acrylate, 2-(isopropenoxyethoxyethoxyethoxy)ethyl(meth)acrylate, 2-(isopropenoxyethoxyethoxyethoxyethoxy)ethyl(meth)acrylate, polyethylene glycol monovinyl ether(meth)acrylate, and polypropylene glycol monovinyl ether(meth)acrylate.

Among these, 2-(vinyloxyethoxy)ethyl(meth)acrylate, or at least one of 2-(vinyloxyethoxy)ethyl acrylate and 2-(vinyloxyethoxy) ethyl methacrylate is preferably used, because they further reduce the viscosity of the ink, have a high flash point, and improve the curability of the ink. Both 2-(vinyloxyethoxy)ethyl acrylate and 2-(vinyloxyethoxy) ethyl methacrylate have a simple structure and a low molecular weight, leading to a significant reduction in viscosity of the ink. Examples of 2-(vinyloxyethoxy)ethyl (meth)acrylate include 2-(2-vinyloxyethoxy)ethyl(meth) acrylate and 2-(1-vinyloxyethoxy)(meth)acrylate. Examples of 2-(vinyloxyethoxy)ethyl acrylate include 2-(2-vinyloxyethoxy)ethyl acrylate and 2-(1-vinyloxyethoxy)ethyl acrylate. Furthermore, 2-(vinyloxyethoxy)ethyl acrylate improves the curability more than 2-(vinyloxyethoxy)ethyl methacrylate.

The vinyl ether group-containing (meth)acrylic acid esters may be used either alone or in combination.

The content of the vinyl ether group-containing (meth) acrylic acid ester, particularly the content of 2-(vinyloxyethoxy)ethyl(meth)acrylate is preferably in a range of 10 to 70% by mass, more preferably in a range of 10 to 60% by mass, and still more preferably in a range of 20 to 50% by mass, based on the total mass (100% by mass) of the ink. When the content is not smaller than the lower limit, the viscosity of the ink is lowered and the curability of the ink is further improved. Furthermore, when the content is not larger than the upper limit, the preservation stability of the ink remains high, further effectively reducing the occurrence of curing wrinkles.

Examples of a method of producing the vinyl ether group-containing (meth)acrylic acid esters include, but are not limited to, esterification of (meth)acrylic acid and hydroxyl group-containing vinyl ether (production method B), esterification of (meth)acrylic acid halide and hydroxyl group-containing vinyl ether (production method C), esterification of (meth)acrylic acid anhydride and hydroxyl group-containing vinyl ether (production method D), transesterification of (meth)acrylic acid ester with hydroxyl group-containing vinyl ether (production method E), esterification of (meth)acrylic acid and halogen-containing vinyl ether (production method F), esterification of alkali (earth) metal salt of (meth)acrylic acid and halogen-containing vinyl ether (production method G), transvinylation of hydroxyl group-containing (meth)acrylic acid ester with vinyl carboxylate (production method H), and transetherification of hydroxyl group-containing (meth)acrylic acid ester with alkyl vinyl ether (production method I).

Among the above methods, the production method E is preferable because it more reliably gives the desired effects in this embodiment.

3.1.2. Monofunctional (Meth)Acrylate

The radiation curable ink preferably contains a monofunctional (meth)acrylate. When the radiation curable ink contains the above-described vinyl ether group-containing (meth)acrylic acid ester (which is limited to monofunctional (meth)acrylate), the vinyl ether group-containing (meth) acrylic acid ester is considered to be included in the above-described monofunctional (meth)acrylate. The description of the vinyl ether group-containing (meth)acrylic acid ester will be omitted. Hereinafter, monofunctional (meth)acrylates other than the above-described vinyl ether group-containing (meth)acrylic acid ester will be described. The presence of the monofunctional (meth)acrylate in the ink lowers the viscosity of the ink, improves the solubility of a photopolymerization initiator and other additives, and improves the curability of the ink. Furthermore, the improvement in the solubility of a photopolymerization initiator and other additives leads to an improvement in the ink ejection stability, improving toughness, heat resistance, and chemical resistance of a coating film.

Examples of the monofunctional (meth)acrylate monomer include phenoxyethyl (meth)acrylate, isoamyl(meth)acrylate, stearyl (meth)acrylate, lauryl(meth)acrylate, octyl (meth)acrylate, decyl(meth)acrylate, isomyristyl(meth)acrylate, isostearyl (meth)acrylate, 2-ethylhexyl-diglycol(meth) acrylate, 2-hydroxybutyl (meth)acrylate, 4-hydroxybutyl (meth)acrylate, 2-methoxyethyl (meth)acrylate, butoxyethyl (meth)acrylate, ethoxy diethyleneglycol (meth)acrylate, methoxydiethylene glycol (meth)acrylate, methoxypolyethylene glycol (meth)acrylate, methoxypropylene glycol (meth)acyrylate, tetrahydrofurfuryl (meth)acrylate, isobornyl (meth)acrylate, 2-hydroxyethyl (meth)acrylate, 2-hydroxypropyl (meth)acrylate, 2-hydroxy-3-phenoxypropyl (meth)acrylate, lactone-modified(meth)acrylate, t-butylcyclohexyl (meth)acrylate, dicyclopentanyl (meth)acrylate, dicyclopentenyloxyethyl (meth)acrylate, benzyl (meth)acrylate, ethoxylated nonylphenyl (meth)acrylate, alkoxylated nonylphenyl (meth)acrylate, and p-cumylphenol EO-modified (meth)acrylate.

Among these, monofunctional (meth)acrylate having an aromatic ring structure in a molecule is preferably employed because it further improves the curability, preservation stability, and the solubility of a photopolymerization initiator. Preferable examples of the monofunctional (meth)acrylate having an aromatic ring structure include, but are not limited to, phenoxyethyl (meth)acrylate, benzyl (meth)acrylate, 2-hydroxyphenoxypropyl (meth)acrylate, and phenoxy diethylene glycol (meth)acrylate. Among these, at least one of phenoxyethyl (meth)acrylate and benzyl (meth)acrylate is preferable, and phenoxyethyl (meth)acrylate is more preferable, because they lower the viscosity of the ink and improve all the curability, the wear resistance, the adhesion and the solubility of a photopolymerization initiator.

The monofunctional (meth)acrylates other than the above-described vinyl ether group-containing (meth)acrylic acid esters may be used either alone or in combination.

The content of the monofunctional (meth)acrylates other than the vinyl ether group-containing (meth)acrylic acid esters is preferably in a range of 10 to 75% by mass, more preferably in a range of 10 to 55% by mass, and still more preferably in a range of 10 to 40% by mass based on the total mass of the ink (100% by mass). When the content is not smaller than the lower limit, the solubility of a photopolymerization initiator is improved in addition to the curability. Furthermore, when the content is not larger than the upper limit, the adhesion is improved in addition to the curability.

When the ink contains the above-described vinyl ether group-containing (meth)acrylic acid ester (which is limited to monofunctional (meth)acrylate), the total content of the monofunctional (meth)acrylate including the vinyl ether group-containing (meth)acrylic acid ester is preferably in a range of 35 to 90% by mass, and more preferably in a range of 40 to 70% by mass based on the total mass of the ink (100% by mass). The content in the above range readily enables the ink viscosity, specifically the ink viscosity at 28° C. and the ink viscosity at the ejection temperature, to be in a desirable range.

3.1.3. Polymerizable Compounds Other Than Above

The radiation curable ink may further contain a polymerizable compound other than the above. Hereinafter, the polymerizable compounds other than the above are referred to as "other polymerizable compounds". Examples of other polymerizable compounds include the above-described monomers and oligomers. Among these, bifunctional or higher functional (meth)acrylate is preferable.

Examples of the bifunctional (meth)acrylates include diethylene glycol di(meth)acrylate, triethylene glycol di(meth)acrylate, tetraethylene glycol di(meth)acrylate, polyethylene glycol di(meth)acrylate, dipropylene glycol di(meth)acrylate, tripropylene glycol di(meth)acrylate, polypropylene glycol di(meth)acrylate, 1,4-butanediol di(meth)acrylate, 1,6-hexanediol di(meth)acrylate, 1,9-nonanediol di(meth)acrylate, neopentyl glycol di(meth)acrylate, dimethylol-tricyclodecane di(meth)acrylate, EO (ethylene oxide) adduct of bisphenol A di(meth)acrylate, PO (propylene oxide) adduct of bisphenol A di(meth)acrylate, hydroxypivalic acid neopentyl glycol di(meth)acrylate, and polytetramethylene glycol di(meth)acrylate.

Examples of the tri or higher functional (meth)acrylate include trimethylolpropane tri(meth)acrylate, EO-modified trimethylolpropane tri(meth)acrylate, pentaerythritol tri(meth)acrylate, pentaerythritol tetra(meth)acrylate, dipentaerythritol hexa(meth)acrylate, ditrimethylolpropane tetra(meth)acrylate, glycerol propoxy tri(meth)acrylate, caprolactone-modified trimethylolpropane tri(meth)acrylate, pentaerythritol ethoxy tetra(meth)acrylate, and caprolactam-modified dipentaerythritol hexa(meth)acrylate.

The other polymerizable compounds may be used either alone or in combination. When the ink contains the other polymerizable compound(s), the content of the other polymerizable compound(s) in the ink is preferably in a range of 5 to 50% by mass based on the total mass (100% by mass) of the ink. In particular, when the ink contains bifunctional (meth) acrylate, the content of bifunctional (meth)acrylate is preferably in a range of 5 to 50% by mass, more preferably in a range of 10 to 45% by mass based on the total mass (100% by mass) of the ink. The content in the above-described range improves the curability of the ink and the wear resistance of the cured substance, making it easy to set the viscosity of ink at a desired value. Furthermore, a combination of monofunctional (meth)acrylate that is a single polymerizable compound having a relatively low viscosity, particularly, the vinyl ether group-containing (meth)acrylic acid ester having a particularly low viscosity, and another polymerizable compound having a relatively high viscosity is preferable. This makes it easy to set the viscosity of the ink at a desired value.

A photopolymerizable compound may be used as the polymerizable compound to eliminate the need for a photopolymerization initiator. However, it is preferable that a photopolymerization initiator be used because the start of polymerization can be easily set.

3.2. Photopolymerization Initiator

The radiation curable ink may contain a photopolymerization initiator. The photopolymerization initiator cures the ink on a surface of a recording medium through photopolymerization when irradiated with ultraviolet rays to make a printed record. Among radiation rays, the ultraviolet (UV) rays are used to secure greater safety and reduce the cost of a light source lamp. The photopolymerization initiator may be any photopolymerization initiator that can initiate polymerization of the polymerizable compound through generation of active species, such as radicals and cations upon exposure to radiation energy. Examples of the photopolymerization initiator include a photo-radical polymerization initiator and a photo-cationic polymerization initiator. Among these, a photo-radical polymerization initiator is preferably employed.

Examples of the photo-radical polymerization initiator include aromatic ketones, acylphosphine oxide compounds, aromatic onium salt compounds, organic peroxides, thio compounds (such as thioxanthone compounds and thiophenyl group-containing compounds), hexaarylbiimidazole compounds, keto oxime ester compounds, borate compounds, adinium compounds, metallocene compounds, active ester compounds, compounds having a carbon-halogen bond, and alkylamine compounds.

Among these, acylphosphine oxide compounds are preferably employed because they further improve the curability of the ink.

Specific examples of the photo-radical polymerization initiator include acetophenone, acetophenonebenzylketal, 1-hydroxycyclohexylphenylketone, 2,2-dimethoxy-2-phenylacetophenone, xanthone, fluorenone, benzaldehyde, fluorene, anthraquinone, triphenylamine, carbazole, 3-methyl-acetophenone, 4-chlorobenzophenone, 4,4'-dimethoxybenzophenone, 4,4'-diaminobenzophenone, Michler's ketone, benzoin propyl ether, benzoin ethyl ether, benzyldimethylketal, 1-(4-isopropylphenyl)-2-hydroxy-2-methylpropan-1-one, 2-hydroxy-2-methyl-1-phenylpropan-1-one, thioxanthone, diethylthioxanthone, 2-isopropylthioxanthone, 2-chlorothioxanthone, 2-methyl-1-[4-(methylthio)phenyl]-2-morpholino-propan-1-one, bis(2,4,6-trimethylbenzoyl)-phenylphosphine oxide, 2,4,6-trimethylbenzoyl-diphenyl-phosphine oxide, 2,4-diethylthioxanthone, and bis-(2,6-dimethoxybenzoyl)-2,4,4-trimethylpentylphosphine oxide.

Examples of commercially available products of the photo-radical polymerization initiator include IRGACURE (registered trademark) 651 (2,2-dimethoxy-1,2-diphenylethan-1-one), IRGACURE 184 (1-hydroxy-cyclohexyl-phenyl-ketone), DAROCUR (registered trademark) 1173 (2-hydroxy-2-methyl-1-phenyl-propan-1-one), IRGACURE 2959 (1-[4-(2-hydroxyethoxy)-phenyl]-2-hydroxy-2-methyl-1-propan-1-one), IRGACURE 127 (2-hydroxy-1-{4-[4-(2-hydroxy-2-methyl-propionyl)-benzyl]-phenyl}-2-methyl-propan-1-one), IRGACURE 907 (2-methyl-1-(4-methylthiophenyl)-2-morpholinopropan-1-one), IRGACURE 369 (2-benzyl-2-dimethylamino-1-(4-morpholinophenyl)-butanone-1), IRGACURE 379 (2-(dimethylamino)-2-[(4-methylphenyl)methyl]-1-[4-(4-morpholinyl)phenyl]-1-butanone), IRGACURE TPO (2,4,6-trimethylbenzoyl-diphenyl phosphine oxide), IRGACURE 819 (bis(2,4,6-trimethylbenzoyl)-phenylphosphine oxide), IRGACURE 784 (bis(η5-2,4-cyclopentadien-1-yl)-bis(2,6-difluoro-3-(1H-pyrrol-1-yl)-phenyl)titanium), IRGACURE OXE 01 (1,2-octanedione, 1-[4-(phenylthio)-,2-(O-benzoyloxime)]), IRGACURE OXE 02 (ethanone,1-[9-ethyl-6-(2-methylbenzoyl)-9H-carbazol-3-yl]-,1-(O-acetyloxime)), IRGACURE 754 (mixture of oxyphenylacetic acid,2-[2-oxo-2-phenylacetoxyethoxy]ethylester, oxyphenylacetic acid, and 2-(2-hydroxyethoxy)ethylester), which are available from BASF, KAYACURE (registered trademark) DETX-S(2,4-diethylthioxanthone) available from Nippon Kayaku Co., Ltd., Speedcure (registered trademark) TPO (2,4,6-trimethylbenzoyl-diphenylphosphin oxide), Speedcure DETX (2,4-diethylthioxanthen-9-one) available from Lambson Ltd., Lucirin (registered trademark) TPO, LR8, LR8970 available from BASF, Ubecryl P36 available from UCB, and Omnirad 819 (bis(2,4,6-trimethylbenzoyl)phenylphosphine oxide) available from IGM Resins B.V.

The photopolymerization initiators may be used either alone or in combination. The content of the photopolymerization initiator is preferably not more than 20% by mass based on the total mass (100% by mass) to improve the curability by increasing the radiation curing rate and to reduce undissolving of the photopolymerization initiator and coloring caused by the photopolymerization initiator.

In particular, when the photopolymerization initiator contains an acylphosphine oxide compound, the content thereof is preferably in a range of 5 to 15% by mass, more preferably in a range of 7 to 13% by mass, based on the total mass (100% by mass) of the ink. When the content is not smaller than the lower limit, the curability is further improved. More specifically described, when the ink is cured using an LED having an emission peak wavelength in a range of 350 nm to 410 nm, the curing rate is sufficiently high and thus the curability is further improved. Furthermore, when the content is not larger than the upper limit, the solubility of the photopolymerization initiator is improved.

3.3 Fluorescent Brightening Agent

The radiation curable ink may contain a fluorescent brightening agent (sensitizer). The fluorescent brightening agent is a colorless or slightly colored compound capable of absorbing light having a wavelength in a range of about 300 to about 450 nm, which is in a range of UV light to short wavelength visible light, and capable of emitting fluorescence having a wavelength in a range of about 40 to about 500 nm. The fluorescent brightening agent is also known as a fluorescent whitening agent. The physical principles and the chemical properties of the fluorescent brightening agent are described in Ullmann's Encyclopedia of Industrial Chemistry, Sixth Edition, Electronic Release, Wiley-VCH, 1998.

The presence of a fluorescent brightening agent in the radiation curable ink further improves the curability.

Examples of the fluorescent brightening agent include, but are not limited to, naphthalene benzoxazolyl derivatives, such as 1,4-bis(2-benzoxazolyl)naphthalene, thiophene benzoxazolyl derivatives, such as 2,5-thiophenediylbis(5-tert-butyl-1,3-benzoxazole), stilbene benzoxazolyl derivatives, coumarin derivatives, styrene biphenyl derivatives, pyrazolone derivatives, stilbene derivatives, styryl derivatives of benzene and biphenyl, bis(benzazol-2-yl) derivatives, carbostyril, naphthalimide, derivatives of dibenzothiophene-5, 5'-dioxide, pyrene derivatives, and pyridotriazoles.

Examples of commercially available fluorescent brightening agents include TELALUX (registered trademark) KCB (1,4-Bis(2-benzoxazolyl)naphthalene available from Clariant Japan, and TINAL OB (2,5-thiophenediylbis(5-tert-butyl-1,3-benzoxazole) available from BASF.

The fluorescent brightening agents may be used either alone or in combination. Furthermore, the content of the fluorescent brightening agent is preferably in a range of 0.1 to 0.5% by mass based on the total of ink (100% by mass). When the content is in the above range, the hue of the cured film, which is possibly affected by the fluorescent brightening agent, is less affected.

3.4. Colorant

The radiation curable ink may contain colorant. At least one of pigment and dye can be used as the colorant.

3.4.1. Pigment

The presence of pigment as colorant improves the light resistance of the ink. The pigment may be an inorganic pigment or an organic pigment.

Examples of inorganic pigments include carbon blacks (C.I. Pigment Black 7) such as furnace black, lamp black, acetylene black, and channel black, iron oxides, and titanium oxides.

Examples of organic pigments include azo pigments, such as insoluble azo pigments, condensed azo pigments, azo lakes, and chelate azo pigments, polycyclic pigments, such as phthalocyanine pigments, perylene and perinone pigments, anthraquinone pigments, quinacridone pigments, dioxane pigments, thioindigo pigments, isoindolinone pigments, and quinophthalone pigments, dye chelates (e.g., basic-dye chelates and acid-dye chelates), dye lakes (basic-dye lakes and acid-dye lakes), nitro pigments, nitroso pigments, aniline black, and daylight fluorescent pigments.

Examples of pigments used in a white ink include C.I. Pigment White 6, 18, and 21.

Examples of pigments used in a yellow ink include C.I. Pigment Yellow 1, 2, 3, 4, 5, 6, 7, 10, 11, 12, 13, 14, 16, 17, 24, 34, 35, 37, 53, 55, 65, 73, 74, 75, 81, 83, 93, 94, 95, 97, 98, 99, 108, 109, 110, 113, 114, 117, 120, 124, 128, 129, 133, 138, 139, 147, 151, 153, 154, 155, 167, 172, and 180.

The yellow ink preferably contains C.I. Pigment Yellow 155. The pigment particularly absorbs active energy having a wavelength in a range of 350 nm to 410 nm. Thus, the presence of the yellow ink containing this pigment noticeably reduces the occurrence of curing wrinkles on the coating film.

Examples of pigments used in a magenta ink include C.I. Pigment Red 1, 2, 3, 4, 5, 6, 7, 8, 9, 10, 11, 12, 14, 15, 16, 17, 18, 19, 21, 22, 23, 30, 31, 32, 37, 38, 40, 41, 42, 48 (Ca), 48 (Mn), 57 (Ca), 57:1, 88, 112, 114, 122, 123, 144, 146, 149, 150, 166, 168, 170, 171, 175, 176, 177, 178, 179, 184, 185, 187, 202, 209, 219, 224, and 245 and C.I. Pigment Violet 19, 23, 32, 33, 36, 38, 43, and 50.

Examples of pigments used in a cyan ink include C.I. Pigment Blue 1, 2, 3, 15, 15:1, 15:2, 15:3, 15:34, 15:4, 16, 18, 22, 25, 60, 65, and 66 and C.I. Vat Blue 4 and 60.

Examples of pigments used in an ink of color other than magenta, cyan, and yellow include C.I. Pigment Green 7 and 10, C.I. Pigment Brown 3, 5, 25, and 26, and C.I. Pigment Orange 1, 2, 5, 7, 13, 14, 15, 16, 24, 34, 36, 38, 40, 43, 63, and 71.

The orange ink preferably contains C.I. Pigment Orange 43 or C.I. Pigment Orange 71. The presence of such a pigment in the orange ink enables, when the orange ink is ejected after the magenta ink and before the black ink, the coating film to have the same gloss as the other films. Thus, a recorded object having a high-quality image is produced.

When a red ink is employed, a pigment used in the red ink is suitably selected from the above-listed pigments used in the magenta ink with consideration of relationship with the pigment in the magenta ink.

The pigments may be used either alone or in combination. When the above pigment is used, an average particle diameter of the pigment is preferably not more than 300 nm, and more preferably in a range of 50 to 200 nm. When the average particle diameter is in the above range, stabilities of the ink such as the ejection stability and the dispersion stability are improved, and thus a high-quality image is formed. The average particle diameter herein is measured by dynamic light scattering.

3.4.2 Dye

Dye can be used as colorant. Any type of dye may be used. Examples of dye include acid dyes, direct dyes, reactive dyes, and basic dyes.

Examples of dye include C.I. Acid Yellow 17, 23, 42, 44, 79, and 142, C.I. Acid Red 52, 80, 82, 249, 254, and 289, C.I. Acid Blue 9, 45, and 249, C.I. Acid Black 1, 2, 24, and 94, C.I. Food Black 1 and 2, C.I. Direct Yellow 1, 12, 24, 33, 50, 55, 58, 86, 132, 142, 144, and 173, C.I. Direct Red 1, 4, 9, 80, 81, 225, and 227, C.I. Direct Blue 1, 2, 15, 71, 86, 87, 98, 165, 199, and 202, C.I. Direct Black 19, 38, 51, 71, 154, 168, 171, and 195, C.I. Reactive Red 14, 32, 55, 79, and 249, and C.I. Reactive Black 3, 4, and 35. The dyes may be used either alone or in combination.

The content of the colorant is preferably in a range of 1 to 20% by mass based on the total mass of the ink (100% by mass) to give higher masking properties and higher color reproducibility.

3.5. Dispersant

When containing pigment, the radiation curable ink may further contain a dispersant to make the pigment more dispersible. The type of dispersant is not limited. Examples of dispersants include dispersants commonly used to prepare pigment dispersion liquid, such as polymeric dispersants. Specific examples thereof include dispersants including, as a main component, at least one of polyoxyalkylene polyalkylene polyamines, vinyl polymers and copolymers, acrylic polymers and copolymers, polyesters, polyamides, polyimides, polyurethanes, amino polymers, silicon-containing polymers, sulfur-containing polymers, fluorine-containing polymers, and epoxy resin. Examples of commercially available polymeric dispersants include AJISPER (registered trademark) series available from Ajinomoto Fine-Techno, Solsperse (registered trademark) series, such as Solsperse 32000 and 36000 available from Lubrizol, DISPERBYK series available from BYK-Chemie, and DISPARLON (registered trademark) available from Kusumoto Chemicals.

The dispersants may be used either alone or in combination. The content of the dispersant is not limited, and the dispersant may be added in a suitable amount.

3.6. Polymerization Inhibitor

The radiation curable ink may contain a polymerization inhibitor. The polymerization inhibitor in the ink prevents polymerization reaction of the polymerizable compound before curing.

Examples of the polymerization inhibitor include, but are not limited to, phenolic polymerization inhibitors. Examples of phenolic polymerization inhibitors include, but are not limited to, p-methoxyphenol, cresol, t-butyl catechol, di-t-butyl-p-cresol, hydroquinone monomethyl ether, α-naphthol, 3,5-di-t-butyl-4-hydroxytoluene, 2,6,-di-t-butyl-4-methylphenol, 2,2'-methylene-bis(4-methyl-6-t-butylphenol), 2,2'-methylene-bis(4-ethyl-6-t-butylphenol), and 4,4'-thio-bis(3-methyl-6-butylphenol).

Examples of commercially available phenolic polymerization inhibitors include p-Methoxyphenol (Hydroquinone Monomethyl Ether (MEHQ)) available from Kanto Chemical Co., Inc., NONFLEX (registered trademark) MBP 2,2'-Methylenebis(4-methyl-6-t-butylphenol) available from Seiko Chemical Co., Ltd., BHT SWANOX (registered trademark) (2,6-Di-t-butyl-4-methylphenol) available from Seiko Chemical Co., Ltd., and ADEKA STAB (registered trademark) LA 7RD (4-Hydroxy-2,2,6,6-tetramethylpiperidine 1-Oxyl) available from ADEKA corporation.

The polymerization inhibitors may be used either alone or in combination. The content of the polymerization inhibitor is not limited, and the polymerization inhibitor may be added in a suitable amount.

3.7. Surfactant

The radiation curable ink may contain a surfactant. Examples of the surfactants include, but are not limited to, silicone surfactants. Preferable examples of the silicone surfactant include polyester-modified silicone and polyether-modified silicone. Among these, at least one of polyether modified polydimethylsiloxane and polyester-modified polydimethylsiloxane is preferable. Examples of commercially available slipping agents include BYK-347, BYK-348, BYK-UV3500, 3510, 3530, and 3570 available from BYK Additives & Instruments.

The surfactants may be used either alone or in combination. The content of the surfactant is not limited, and the surfactant may be added in a suitable amount.

3.8. Other Additives

The radiation curable ink may contain additives (components) other than the above-described additives. Examples of such components may include, but are not limited to, polymerization accelerators, penetration enhancers, moisturizing agents (humectants), and other known additives. Examples of the "other additives" include known fixatives, antifungal agents, preservatives, antioxidants, ultraviolet absorbents, chelators, pH-adjusting agents, and thickeners.

The ink jet recording method according to the present disclosure was described above with reference to the embodiment illustrated in the drawings. However, the ink jet recording method according to the present disclosure is not limited to the above-described embodiment. For example, the embodiment may include an additional step for achieving any purpose.

Next, an example of the present disclosure will be described.

4. Preparation of Radiation Curable Ink

Components in Table 1 and Table 2 are mixed to form mixtures having the compositions in Table 1. Then, the mixtures were each stirred with a high-speed water-cooled stirrer. Thus, radiation curable inks of different colors were produced.

TABLE 1

| | | Product name or compound name of radiation curable ink | Content (% by mass) |
|---|---|---|---|
| Polymerizable compound | Vinyl ether group-containing (meth)acrylic acid ester | 2-(2-Vinyloxyethoxy)ethyl acrylate available from NIPPON SHOKUBAI CO., LTD. | 15 |
| | Monofunctional (meth)acrylate | Viscoat#192 (Phenoxyethyl acrylate) available from OSAKA ORGANIC CHEMICAL INDUSTRY LTD. | 47.4 |
| | Other polymerizable compound | SR508 (dipropylene glycol diacrylate) available from SATOMER | 20 |
| Photopolymerization initiator | | Omnirad 819 (bis(2,4,6-trimethylbenzoyl)phenylphosphine oxide) available from IGM Resins B.V. | 4 |
| | | IRGACURE TPO(2,4,6-trimethylbenzoyl-diphenyl phosphine oxide (TPO)) available from BASF | 10 |
| | | Speedcure DETX (2,4-diethylthioxanthen-9-one (DETX)) available from LAMBSON | 0.2 |
| Polymerization inhibitor | | p-Methoxyphenol (Hydroquinone monomethyl ether (MEHQ)) available from KANTO CHEMICAL CO.,INC. | 0.1 |
| | | ADK STAB LA-7RD (4-hydroxy-2,2,6,6-tetramethylpiperidinyl-1-oxyl) available from ADEKA Corporation | 0.1 |
| Fluorescent brightening agent | | TELALUX KCB (1,4-Bis(2-benzoxazolyl)naphthalene available from Clariant Japan | 0.2 |
| Surfactant | | BYK-UV3500 (polyether modified acryl functional polydimethylsiloxane) available from BYK Additives & Instruments | 0.5 |
| Colorant | | Refer to Table 2 | 2 |
| Dispersant | | Solsperse 36000 (polymeric dispersant) available from Lubrizol | 0.5 |
| Total | | | 100 |

TABLE 2

| Color (symbol) | Colorant |
| --- | --- |
| Cyan (C) | C.I. Pigment Blue 15:3 |
| Magenta (M) | C.I. Pigment Red 122 |
| Orange (Or1) | C.I. Pigment Orange 43 |
| Orange (Or2) | C.I. Pigment Orange 71 |
| Red (R) | C.I. Pigment Red 57:1 |
| Black (K) | Carbon Black |
| Yellow (Y) | C.I. Pigment Yellow 155 |

5. Ink Jet Recording by Printer 5.1. Example 1

Radiation curable inks indicated in Table 3 were loaded in the cyan head 32C, the magenta head 32M, the orange head 32Or, the black head 32K, and the yellow head 32Y of the printer 1 illustrated in FIG. 2. In Table 3, a first head is the line head 32 at the position of the cyan head 32C in FIG. 2, a second head is the line head 32 at the position of the magenta head 32M, a third head is the line head 32 at the position of the orange head 32Or, a fourth head is the line head 32 at the position of the black head 32K, and a fifth head is the line head 32 at the position of the yellow head 32Y. In Table 3, colors of the radiation curable inks ejected from the heads are indicated by symbols. The relationship between the symbols and the colors are as indicated in Table 2.

Next, solid pattern images of different colors were printed on a PET film, Lumirror 125E20 available from TORAY, over different areas at ordinary temperature and under ordinary pressure to produce a recorded object. The thickness of the produced coating film was 6 μm.

After the ejection of the inks of different colors, the inks were irradiated with the temporary curing radiation or the full curing radiation. The irradiation conditions with the temporary curing radiation and the irradiation conditions with the full curing radiation are as indicated in Table 4. A UV-LED that emits ultraviolet rays having a wavelength of 395 nm was used as the radiation source.

5.2. Example 2

Solid pattern images were printed to produce a recorded object in the same way as in Example 1 except that the third head was changed to the black head 32K, the fourth head was changed to the yellow head 32Y, and the radiation source of the temporary curing radiation that is disposed downstream of the fourth head and the fifth head were eliminated.

5.3. Examples 3 to 5

Solid pattern images were printed to produce a recorded object in the same way as in Example 1 except that the kinds of the radiation curable inks loaded in the printer 1 and the radiation irradiation conditions were changed as indicated in Tables 3 and 4.

5.4. Comparative Examples 1 to 3

Solid pattern images were printed to form a recorded object in the same way as in Example 1 except that the kinds of the radiation curable inks loaded in the printer 1 and the radiation irradiation conditions were changed as in Tables 3 and 4.

TABLE 3

| | Ink Jet Recording Conditions | | | | | | | | | | Evaluation | |
| --- | --- | --- | --- | --- | --- | --- | --- | --- | --- | --- | --- | --- |
| | 1$^{st}$ head | Temporary curing | 2$^{nd}$ head | Temporary curing | 3$^{rd}$ head | Temporary curing | 4$^{th}$ head | Temporary curing | 5$^{th}$ head | Temporary curing | Full curing | Specular gloss |
| Ex. 1 | C | con. 1 | M | con. 1 | Or1 | con. 1 | K | con. 1 | Y | — | Yes | (A) |
| Ex. 2 | C | con. 1 | M | con. 1 | K | con. 1 | Y | — | — | — | Yes | (A) |
| Ex. 3 | C | con. 1 | M | con. 1 | R | con. 1 | K | con. 1 | Y | — | Yes | (A) |
| Ex. 4 | C | Con. 2 | M | Con. 2 | Or1 | Con. 2 | K | Con. 2 | Y | — | Yes | (B) |
| Ex. 5 | C | con. 1 | M | con. 1 | Or2 | con. 1 | K | con. 1 | Y | — | Yes | (A) |
| Com. Ex. 1 | C | con. 1 | M | con. 1 | Or1 | con. 1 | K | con. 1 | Y | con. 1 | Yes | (C) |
| Com. Ex. 2 | C | con. 1 | M | con. 1 | Or1 | con. 1 | Y | con. 1 | K | con. 1 | Yes | (C) |
| Com. Ex. 3 | C | con. 1 | M | con. 1 | Or1 | con. 1 | Y | con. 1 | K | — | Yes | (C) |

TABLE 4

| | Radiation irradiation condition | | | |
| --- | --- | --- | --- | --- |
| | | Irradiation peak intensity mW/cm$^2$ | Irradiation duration second | Irradiation energy mJ/cm$^2$ |
| Temporary curing radiation | con. 1 | 300 | 0.01 | 3 |
| | con. 2 | 1000 | 0.02 | 20 |
| Full curing radiation | — | 1500 | 0.20 | 300 |

6. Evaluation of Recorded Object

The coating films of the recorded objects formed in the Examples and the Comparative Examples were subjected to measurements of specular gloss and then evaluated. In the measurement of the specular gloss, a three-angle gloss meter, Multi Gloss 268A available from KONICA MINOLTA JAPAN, INC., was used. The measurement was performed at three places at a measurement angle of 60° in accordance with the method defined in JIS K 5600-4-7: 1999. The three places each stretch over the coating films of inks of different colors. The averages of the measurement values were evaluated with reference to the evaluation criteria below:

(A): 85 or more
(B): 50 or more and less than 85
(C): less than 50

The evaluation results are indicated in Table 3.

As indicated in Table 3, the recorded objects produced in the Examples have higher specular gloss than the recorded objects produced in the Comparative Examples. It is revealed that the present technology reduces the curing wrinkles caused by the yellow ink, which absorbs more active energy with the pigment, resulting in production of a recorded object having high gloss in every coating film.

The coating films of the recorded objects produced in the Examples were observed under magnification, and no big curing wrinkles were found. However, the specular gloss was particularly higher when the irradiation energy of the temporary curing radiation satisfies the condition 1 than when satisfying the condition 2. This result shows that, when the irradiation energy of the temporary curing radiation is slightly large, the difference in the curing rate between the inner portion and the surface of the coating film becomes large and the difference may increase the possibility that the surface will have curing wrinkles.

In contrast, the coating films of the recorded objects produced in the Comparative Examples were observed under magnification, and big curing wrinkles were found. In the Comparative Example 1, although the yellow ink was the last ink in the ejection order and, shortly after the ejection, the yellow ink was irradiated with the temporary curing radiation, not the full curing radiation. Furthermore, in the Comparative Examples 2 and 3, the yellow ink was not the last ink in the ejection order and thus irradiated with the temporary curing radiation shortly after the ejection of the yellow ink.

The yellow ink absorbs more active energy as described above. Thus, when irradiated with the temporary curing radiation, the yellow ink shortly after the ejection has a big difference in the curing rate between the inner portion and the surface of the coating film. This causes the surface to be cured before the ink sufficiently wet spreads and causes the inner portion to remain uncured for long. This probably caused the curing wrinkles on the coating films of the recorded objects produced in the Comparative Examples.

What is claimed is:

1. An ink jet recording method in which a cyan ink, a magenta ink, a black ink, and a yellow ink that are radiation curable inks are ejected from ink jet heads to a recording medium, the method comprising, in this order:

a first step of attaching the cyan ink, the magenta ink, and the black ink onto a recording medium and applying temporary curing radiation to the recording medium; and a second step of attaching the yellow ink onto the recording medium and applying full curing radiation to the recording medium without applying the temporary curing radiations, wherein an irradiator that applies the full curing radiation is adjacent to a yellow head that ejects the yellow ink, and wherein an amount of time that elapses between the attaching of the yellow ink and the applying the full curing radiation from the irradiator is one second or less.

2. The ink jet recording method according to claim 1, wherein the cyan ink, the magenta ink, and the black ink that are the radiation curable inks are attached to the recording medium in this order.

3. The ink jet recording method according to claim 2, wherein the first step includes, in this order: a 1a step of attaching the cyan ink onto the recording medium and applying the temporary curing radiation to the cyan ink on the recording medium; a 1b step of attaching the magenta ink onto the recording medium and applying the temporary curing radiation to the magenta ink on the recording medium; and a 1c step of attaching the black ink onto the recording medium and applying the temporary curing radiation to the black ink on the recording medium.

4. The ink jet recording method according to claim 3, wherein the first step further includes, after the 1b step and before the 1c step, a 1d step of attaching one of an orange ink and a red ink that are radiation curable inks onto the recording medium and applying the temporary curing radiation to the recording medium.

5. The ink jet recording method according to claim 4, wherein the orange ink contains C.I. Pigment Orange 43 or C.I. Pigment Orange 71.

6. The ink jet recording method according to claim 1, wherein the yellow ink contains C.I. Pigment yellow 155.

7. The ink jet recording method according to claim 1, wherein the temporary curing radiation and the full curing radiation have peak wavelengths of not less than 350 nm and not more than 410 nm.

8. The ink jet recording method according to claim 1, wherein the temporary curing radiation has irradiation energy of not more than 20 mJ/cm$^2$.

9. The ink jet recording method according to claim 1, wherein the full curing radiation has irradiation energy of not less than 50 mJ/cm$^2$.

* * * * *